Nov. 13, 1945.  R. W. DE LANCEY  2,388,907
VAPORIZING BURNER
Filed April 26, 1944
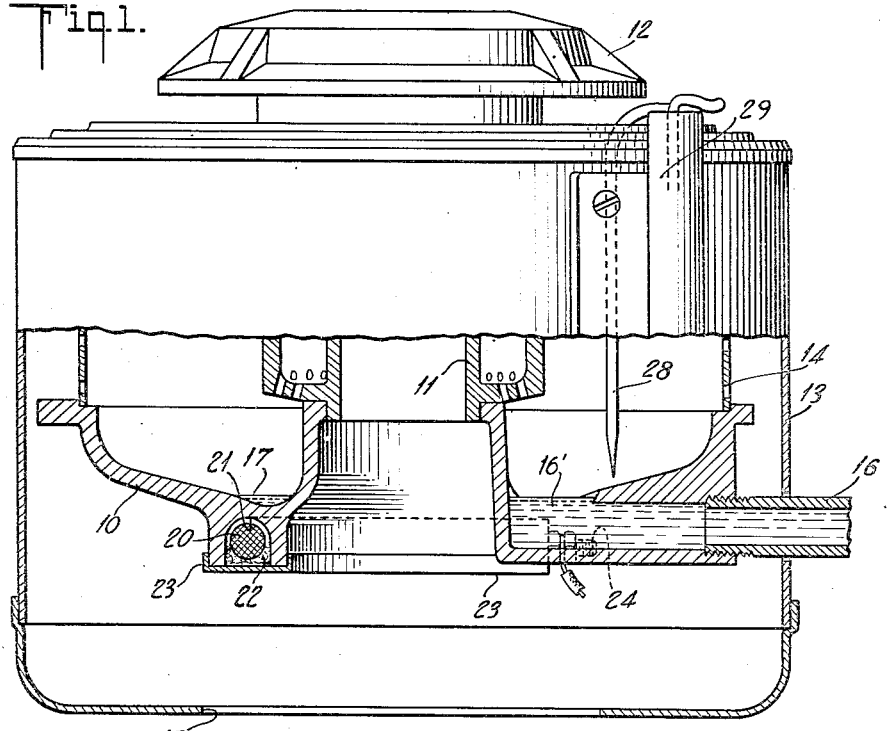
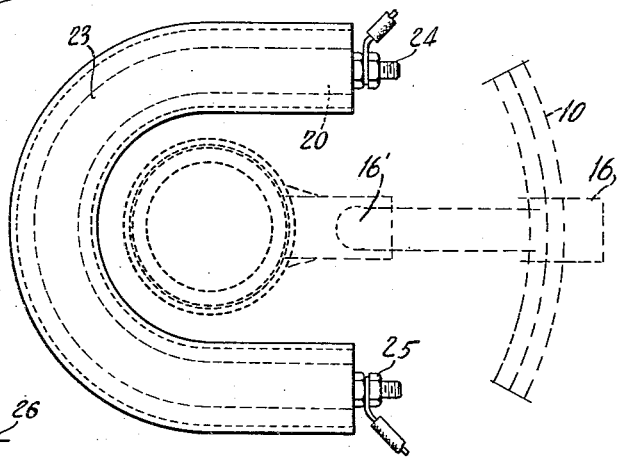
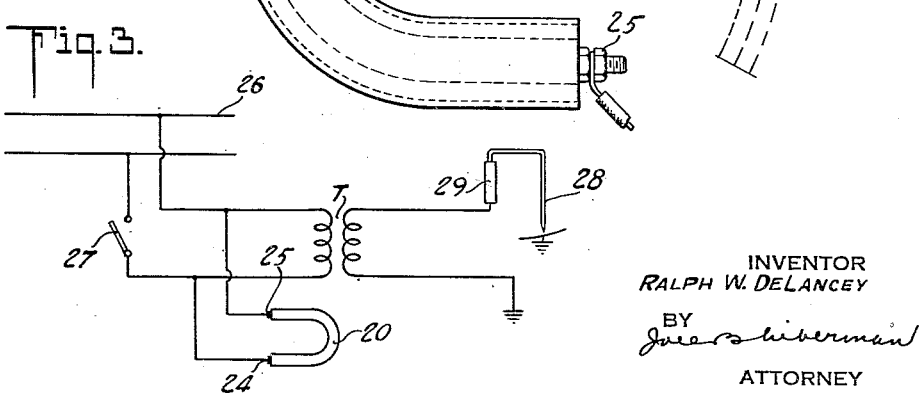
INVENTOR
RALPH W. DELANCEY
BY
ATTORNEY Patented Nov. 13, 1945

2,388,907

UNITED STATES PATENT OFFICE 2,388,907

VAPORIZING BURNER

Ralph W. De Lancey, Meriden, Conn., assignor to The Miller Company, Meriden, Conn., a corporation of Connecticut Application April 26, 1944, Serial No. 532,703

1 Claim. (Cl. 158—28)

The present invention relates to vaporizing burners, and is more particularly directed toward the provision of such burners with improved electrical preheating and ignition means.

When low grade oil fuel is supplied to a cold vaporizing type oil burner the dissipation of heat generated by an arc directed onto the vaporizer surface is so rapid that it is difficult to secure ignition. The present invention contemplates providing the vaporizer or pot with an electric heater out of contact with the fuel but adapted to heat the vaporizer and facilitate vaporization of the oil. As the heating and ignition system need operate only when the burner is being started, they are preferably connected in parallel so that one switch may be used to control both.

The accompanying drawing shows, for purposes of illustrating the present invention, an embodiment in which the invention may take form, it being understood that the drawing is illustrative of the invention rather than limiting the same.

In the drawing:

Figure 1 is a vertical sectional view through a vaporizing burner with parts in elevation;

Figure 2 is an inverted plan view showing the heater and cover and their relation to the oil supply passage; and Figure 3 is a wiring diagram.

The liquid fuel burner is constructed generally according to the showing in my patent application Serial No. 377,613 filed February 6, 1941. It has a vaporizer or pot 10 generally made of cast iron, a central air distributor 11, flame spreader 12, housing 13 and a perforated sleeve 14. The bottom of the housing is open as indicated at 15 and communicates with a blower (not shown). The fuel is supplied by a conduit or pipe indicated at 16, and is adapted to flow through an oil supply passage 16' opening laterally into the bottom of the vaporizer and form an annular pool indicated at 17.

According to the present invention the bottom of the vaporizer casting 10 carries U-shaped electric heater 20 which may be similar to the material used in the heaters of electric ranges and the like. It is here shown as being received in a cavity 21 disposed substantially directly under the deepest part of the pool 17 and approximately three-quarters of the circular arc at this radius. The open side of the U is adjacent the supply passage.

The heater is held in place by packing indicated at 22 and a cover ring indicated at 23. Its terminals 24 and 25 are connected to a suitable power line 26 through a switch 27. The switch 27 also controls an ignition transformer T which supplies arcing potential to an electrode 28 secured to an insulating support 29. As indicated in Figure 1 the lower end of the electrode is within arcing distance of the upper surface of the vaporizer, and when the heater is connected to the source of power it acts to heat the vaporizer or pot and contained liquid, and this facilitates capillary travel up the surface of the vaporizer and also produces vapors in the region of the gap so that these vapors may be ignited.

The circuit shown in Figure 3 is a simple one indicating a manually controlled switch, but this switch could well be a switch in an automatic starting control circuit tied in with the room thermostat and metering valve control.

Since it is obvious that the invention may be embodied in other forms and constructions within the scope of the claim, I wish it to be understood that the particular form shown is but one of these forms, and various modifications and changes being possible, I do not otherwise limit myself in any way with respect thereto.

What is claimed is:

A liquid fuel burner comprising an annular vaporizer having an upwardly extending annular inner wall and an upwardly and outwardly sloping bottom wall so that an annular pool of oil may be formed about the inner periphery of the vaporizer bottom, a central air distributor above the inner wall, a perforated sleeve above the outer periphery of the pot, an oil supply passage opening laterally into the bottom of the vaporizer, an ignition electrode extending down through the space between the sleeve and central air distributor, the pot having a downwardly opening U-shaped recess substantially directly under the deepest part of the pool, the open side of the U being adjacent the supply passage, and an electric heater in the recess for heating the pot to facilitate the capillary flow of fuel over the vaporizer surface to the region opposite the electrode.

RALPH W. DE LANCEY.